United States Patent [19]

Hashiguchi

[11] 4,205,555
[45] Jun. 3, 1980

[54] ULTRASONIC DIAGNOSTIC APPARATUS

[75] Inventor: Mutsuo Hashiguchi, Tokyo, Japan

[73] Assignee: Tokyo Shibaura Electric Co., Ltd., Japan

[21] Appl. No.: 906,662

[22] Filed: May 16, 1978

[30] Foreign Application Priority Data

May 17, 1977 [JP] Japan .................................. 52/56807

[51] Int. Cl.² ............................................ G01N 29/00
[52] U.S. Cl. ........................................ 73/626; 73/631; 73/900
[58] Field of Search .................. 73/631, 900, 628, 626

[56] References Cited

U.S. PATENT DOCUMENTS

| | | | |
|---|---|---|---|
| 3,287,962 | 11/1966 | Relyea et al. ........................... | 73/631 |
| 3,348,410 | 10/1967 | Henry ................................. | 73/631 X |
| 3,605,504 | 9/1971 | Kummer, Jr. et al. ............. | 73/900 X |
| 4,016,862 | 4/1977 | Lancee et al. ...................... | 73/900 X |
| 4,140,107 | 2/1979 | Lancee et al. ...................... | 73/900 X |

FOREIGN PATENT DOCUMENTS 49-98080  7/1974  Japan .

*Primary Examiner*—Charels A. Ruehl

*Attorney, Agent, or Firm*—Finnegan, Henderson, Farabow, Garrett & Dunner

[57] ABSTRACT

An ultrasonic diagnostic apparatus is provided comprising a clock pulse generator, and electro-acoustic transducer which responds to the clock pulse from the clock pulse generator to produce an ultrasonic wave, a receiving circuit for receiving the electrical signal from the electro-acoustic transducer, a variable gain amplifier for amplifying the output signal from the receiving circuit, a display device for displaying information corresponding to the signal from the amplifier, and a gain control circuit for controlling the gain of the variable gain amplifier.

The gain control circuit includes an integrating circuit, a signal generator for providing a signal with a variable level to the integrating circuit, a switching circuit coupled in parallel with the integrating circuit, a monostable multivibrator which responds to the clock pulse from the clock pulse generator to render the switching circuit conductive only during a given time period, a reference level signal generator, and an adder circuit which sums the output signals from the integrating circuit and the reference level signal generator and applies the summed signal to the gain control terminal of the variable gain amplifier.

35 Claims, 8 Drawing Figures

ULTRASONIC DIAGNOSTIC APPARATUS

The invention relates to an ultrasonic diagnostic apparatus.

The ultrasonic diagnostic apparatus radiates ultrasonic waves which are reflected from the living body, and provides the information concerning the organism of the living body on the basis of the reflected ultrasonic waves. Ultrasonic pulses projected into the living body attenuate as they go deeper, i.e. as time lapses, by reason of absorption, scattering, diffusion and the like of ultrasonic pulses in the organism. This distorts the information concerning the organism. For correction of the distorted information, a variable gain amplifier has been used whose gain changes with time, and the electrical signal corresponding to the ultrasonic pulse received is amplified by the variable gain amplifier. The control signal used for changing the gain of the variable gain amplifier is generated by a well-known type control signal generator 1 having a plurality of adjusting levers as shown in FIG. 1. When these adjusting levers 2 are set at the position shown in FIG. 1, the control signal generator 1 produces an output signal having a level changing with time, corresponding to the position of the adjusting levers 2 and applies it to the variable gain amplifier. As a result, the gain of the variable gain amplifier changes with time as shown in FIG. 2. Through individual adjustment of the adjusting levers 2 of the control signal generator 1, it is possible to selectively set the gain of the variable amplifier with the time intervals each corresponding to the distance of, for example, 2 cm, in depth of the organism. In this manner, the organism information distorted by the attenuation may be well corrected. Practically, in the correction, while monitoring the constantly changing tomograph on the display device, an operator must search the tested portion of the organism by a probe with one hand and at the same time adjust the adjusting levers of the signal generator 1. In order to obtain a good picture, it is very difficult to properly and precisely adjust the adjusting levers 2, and long time is taken for this operation. Particularly, in heart inspection, momentarily changing motion of the heart must be monitored so that the operator must always keep an eye on the tomograph. Accordingly, it is very difficult to precisely perform such a troublesome operation of the adjusting levers. For example, when it is desired to change the gain of the variable gain amplifier with short time intervals in the time zone corresponding to the position between the rear wall of the heart and the lung, a number of adjusting levers are necessary and the operation will be more complicated.

Accordingly, an object of the invention is to provide an ultrasonic diagnostic apparatus in which the gain of a variable gain amplifier for amplifying an electric signal corresponding to an ultrasonic wave signal received may be increased or decreased at a selected rate of change from a selected time point, through a simple operation.

According to one aspect of the invention, there is provided an ultrasonic diagnostic apparatus comprising: pulse generating means to radiate ultrasonic waves; electro-acoustic transducing means which responds to pulses generated from the pulse generating means and produces electrical signals corresponding to ultrasonic pulses received; a variable gain amplifying circuit for amplifying the electrical signals from the electro-acoustic transducing means; a gain control circuit for providing a gain control signal changing at a selected rate a given time after the pulse generation from the pulse generating means.

Other objects and features of the invention will be apparent from the following description taken in connection with the accompanying drawings, in which.

A detailed description of an ultrasonic diagnostic apparatus according to an embodiment of the invention will be given with reference to FIGS. 3 to 8.

Figure 3:
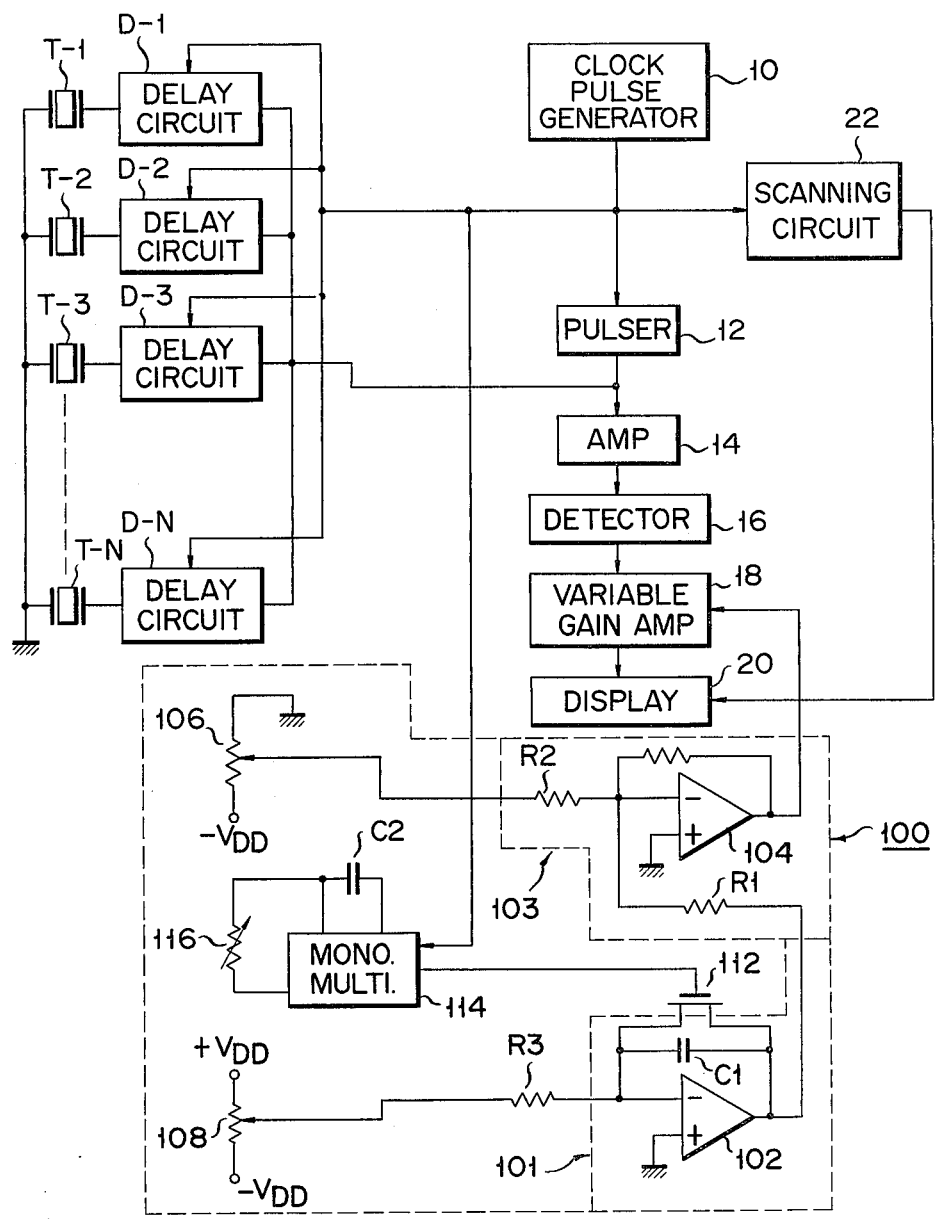
FIG. 3 shows a circuit diagram of an embodiment of an ultrasonic diagnostic apparatus according to the invention.

The ultrasonic diagnostic apparatus shown in FIG. 3 includes a clock pulse generator 10, a pulser 12 for generating pulses in response to a pulse from the clock pulse generator 10, delay circuits D-1 to D-N each for delaying the pulse from the pulser 12 by a given different time and electro-acoustic transducers T-1 to T-N for producing ultrasonic wave pulses in response to the output pulses from the delay circuits D-1 to D-N, respectively. The ultrasonic pulses received by the electro-acoustic transducers T-1 to T-N are converted into electric signals which in turn are applied through the delay circuits D-1 to D-N into a logarithmic amplifier 14. The output signal of the logarithmic amplifier 14 is applied through a detector circuit 16 to a variable gain amplifier 18 where it is amplified with an amplification factor varying with time and is then delivered to a display 20 for its display. The gain of the variable gain amplifier 18 is controlled by a gain control circuit 100 to be described in detail later. A scanning circuit 22 responds to a clock pulse from a closk pulse generator 10 to produce a scan signal for driving the display 20.

Figure 1:
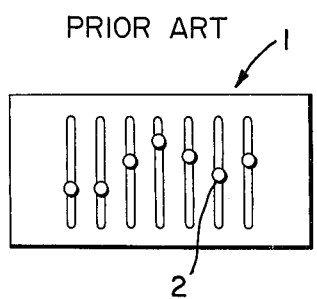
FIG. 1 shows a schematic diagram of a control signal generator with a plurality of adjusting levers for feeding a control signal to a variable gain amplifier used in a conventional ultrasonic diagnostic apparatus.
Figure 2:
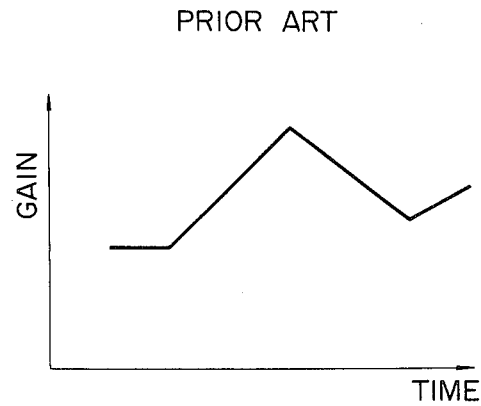
FIG. 2 is a graph illustrating a gain characteristic of the variable gain amplifier when the adjusting levers are set as shown in FIG. 1.
Figure 4:
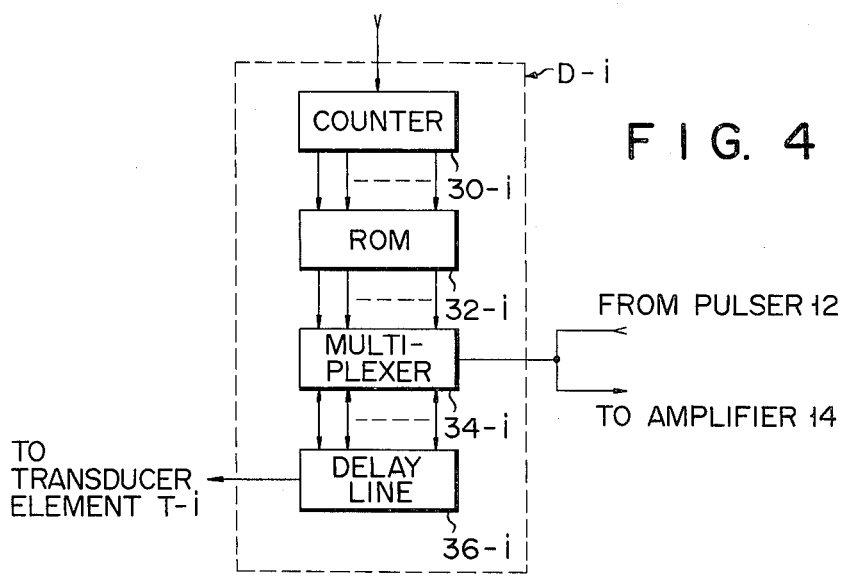
FIG. 4 shows a circuit diagram of a delay circuit used in the ultrasonic diagnostic apparatus shown in FIG. 3.

FIG. 4 shows a delay circuit D-i which is one of the delay circuits D-1 to D-N. The delay circuit D-i includes a counter 30-i which is driven by a clock pulse from the clock pulse generator 10 to produce an address signal, a read only memory (ROM) which responds to the address signal from the counter 30-i to produce delay time information stored in the memory location specified by the address signal, a multiplexer 34-i having a plurality of input/output lines and energizing one of the input/output lines in accordance with the delay time information from the ROM32-i, and a delay line 36-i having a plurality of taps coupled with the input/output lines of the multiplexer 34-i. From a hardware viewpoint, these delay circuits D-1 to D-N are the same. However, the contents of the respective delay circuits are so different that, in response to the same address signals from the counters 30, the delay lines 36 delay the input pulses from the pulser 12 by delay times $(N-1)\cdot d/c\cdot\sin\theta_i$, $(N-2)\cdot d/c\cdot\sin\theta_i$, ... $d/c\cdot\sin\theta_i$, 0 (where $\theta_1$ is a deviation angle of a supersonic wave beam radiated from the electro-acoustic transducing elements T, d is a distance between adjacent transducing elements, and c is the sound velocity, approx. 1500 m/s, in a traveling medium) and apply them to the corresponding electro-acoustic transducing elements T. Accordingly, the electro-acoustic transducing elements T produce ultrasonic pulses successively delayed by a given delay time, $d/c \sin \theta_i$, with respect to those produced from the adjacent transducing elements. Upon receipt of the electrical pulses, the electro-acoustic transducing elements T each produces an ultrasonic wave beam with an angle $\theta_i$ corresponding to the delay time. In other words, as the clock pulses from the clock pulse generator 10 successively change the contents of the counter 30, the ROM 32 produces the corresponding different delay time information, and therefore the electro-acoustic transducing elements T produce an ultrasonic wave beam in a different direction by which a human body, for example, is sector-scanned.

The explanation to follow is the operation of the ultrasonic diagnostic apparatus shown in FIG. 3.

When the clock pulse generator 10 generates a clock pulse, the delay circuits D-1 to D-N are set to have the delay time information $(N-1)d/c \sin \theta_i$, $(N-2)d/c \sin \theta_i$, ... $\sin \theta_i$ and 0 while at the same time a pulse from the pulser 12 is supplied to and delayed by the respective delay times by the delay circuits D-1 to D-N. The and the delayed pulses are then applied to the electro-acoustic transducers T-1 to T-N. Upon receipt of the pulses, the electro-acoustic transducers T-1 to T-N radiate ultrasonic pulses into the human body, for example. The ultrasonic pulses are reflected from boundary portions inside the human body, and the reflected ones are received by the electro-acoustic transducers T-1 to T-N where these reflected ultrasonic pulses are converted into corresponding electrical signals. The electrical signals converted by the electro-acoustic transducers T-1 to T-N are delayed by the above-mentioned delay times in the delay circuits D-1 to D-N and then are supplied through the logarithmic amplifier 14 and the detector circuit 16 to the variable gain amplifier 18. The variable gain amplifier 18 amplifies the input signal with the amplification factor controlled by the output signal from the control circuit 100. The amplified signal goes to the display device 20 where a tomographic picture of the human body corresponding to the amplfied signal is displayed.

The control circuit 100 shown in FIG. 3 includes an integrating circuit 101 constituted by an amplifier 102 and a capacitor C1 and an amplifier 104 receiving the output signal from the integrating circuit 101 via a resistor R1. The output signal from the amplifier 104 is used as a gain control signal to the variable gain amplifier 18. A movable terminal or a wiper of a potentiometer 106 connected between a ground terminal and negative power source terminal $-V_{DD}$ is connected to the input terminal of the amplifier 104 through a resistor R2. The resistors R1 and R2 and the amplifier 104 constitute an adder circuit 103 which sums the output signals of the potentiometer 106 and the integrating circuit 101 and provides the summed signal to the gain control terminal of the variable gain amplifier 18.

The movable terminal of a potentiometer 108 connected between the positive and negative power source terminals $+V_{DD}$ and $-V_{DD}$ is coupled to the input terminal of the integrating circuit 101, through a resistor R3. An analogue switch 112 constructed by, for example, an FET is coupled across the capacitor C1 of the integrating circuit 101. The analogue switch 112 is controlled by a monostable multivibrator 114 which is set by the clock signal from the clock pulse generator 10 to produce a high level signal during a given time period. The high level period of the output signal from the monostable multivibrator 114 depends on the time constant defined by a capacitor C2 and a variable resistor 116. That is, when set by the clock signal from the clock pulse generator 10, the monostable multivibrator 114 produces a high level signal during a period of time defined by the capacitor C2 and the resistor 116 to turn on the analogue switch 112 and thereby to stop the operation of the integrating circuit 101. Accordingly, during this period of time, the gain control signal to the gain control terminal of the variable gain amplifier 18, i.e. the output signal of the adder 103, is substantially determined by the output voltage of the potentiometer 106. Therefore, the gain of the variable gain amplifier 18 is kept constant during this period of time. Then, the output signal of the monostable multivibrator 114 becomes low in level to turn off the analogue switch 112. When the analogue switch 112 is turned off, the integrating circuit 101 starts to integrate the output voltage of the potentiometer 108. In this case, the direction and rate of the change of the integrating signal from the integrating circuit 101 depends substantially on the polarity and level of the output voltage of the potentiometer 108. That is, when the output voltage of the potentiometer is positive, the gain of the variable gain amplifier 18 increases as indicated by a continuous line in FIG. 5 and, when it is negative, the gain decreases as indicated by broken lines.

Thus, the gain of the variable gain amplifier 18 sustains a fixed level determined by the position of the movable terminal of the potentiometer 106 during the period of time, set by the variable resistor 116, after the clock pulse is generated from the clock pulse generator 10. After the lapse of this time, the gain changes with the direction and rate defined by the polarity and level of the output voltage of the potentiometer 108. The period of time from generation of the clock pulse by the clock pulse generator 10 till the initiation of the integrating operation by the integrating circuit 101 is set at preferably several ten micro-seconds to one milli-second by the variable resistor 116.

For example, when the ultrasonic pulses reflected from the boundary portion inside a human body to be diagnosed is weak, a proper tomograph of the human body can be obtained by the following steps. First, the variable resistor 116 is adjusted to set a timing at which the gain of the variable gain amplifier 18 starts rising, and then the potentiometer 108 is adjusted to produce a proper positive voltage so that the gain of the variable gain amplifier 18 may be increased with time at a desired rate to intensify the weak pulse. On the other hand, when the reflected ultrasonic pulse is too strong, the gain fall point of the variable gain amplifier 18 is set up by adjusting the variable resistor 116 and then a proper negative output voltage is produced by adjusting the potentiometer 108. The gain of the variable gain amplifier 18 is controlled at a desired rate of change through the adjustment of the potentiometer 108. Thus, a high quality of the tomograph may be obtained by adjusting the potentiometers 106 and 108 and the variable resistor 116 while monitoring the picture on the display device 20.

Figure 6:
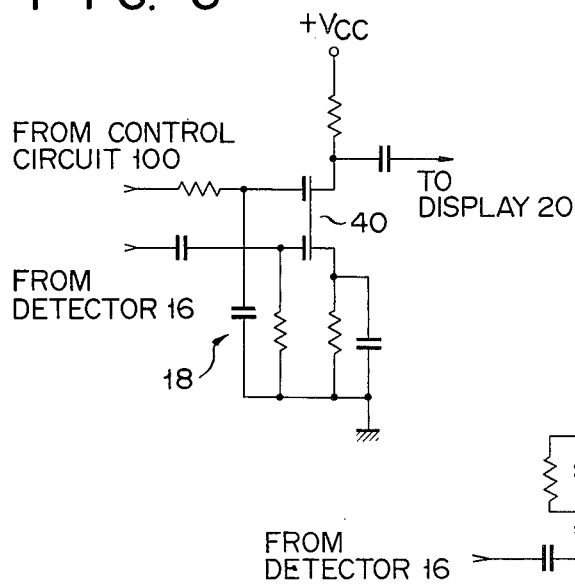
FIGS. 6 and 7 show circuit diagrams of variable gain amplifiers adaptable for the variable gain amplifier in the FIG. 3 apparatus.
Figure 7:
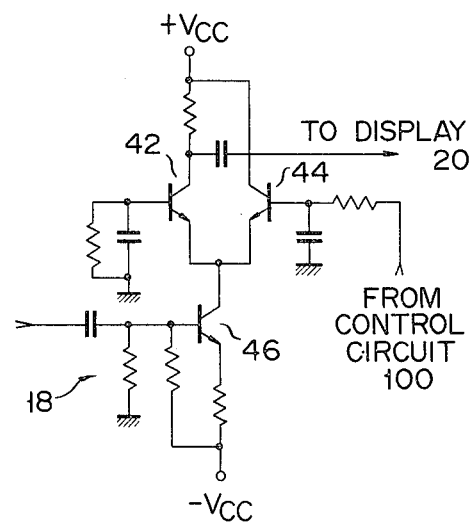

Referring now to FIGS. 6 and 7, there are shown circuit diagrams of known variable gain amplifiers available for the variable gain amplifier 18.

The variable gain amplifier 18 shown in FIG. 6 uses a dual gate FET 40. The dual gate FET 40 is connected at the first gate terminal to the input terminal of the detector circuit 16 through a capacitor, at the second gate terminal to the output terminal of the gain control circuit 100 through a resistor, and at the drain terminal to the display device through a capacitor. The mutual conductance, i.e. the gain, of the dual gate FET 40 is controlled by a DC voltage from the gain control circuit 100. The dual gate FET 40 amplifies the input signal from the detector circuit 16 with the gain corresponding to the output voltage from the gain control amplifier 100 and supplies the amplified output signal to the display device 20.

A variable gain amplifier 18 shown in FIG. 7 includes a differential amplifier including transistors 42 and 44 and a transistor 46 which is connected at the collector to the emitters of the transistors 42 and 44. The collector of the transistor 42 is coupled with the display 20 thorugh a capacitor. The base of the transistor 44 is connected to the output terminal of the gain control circuit 100. The base of the transistor 46 is coupled with the detector circuit 16.

When the output voltage of the gain control circuit 100 changes, the collector current changes and then the collector current of the transistor 42 changes and therefore the gain of this circuit can be changed.

Figure 8:
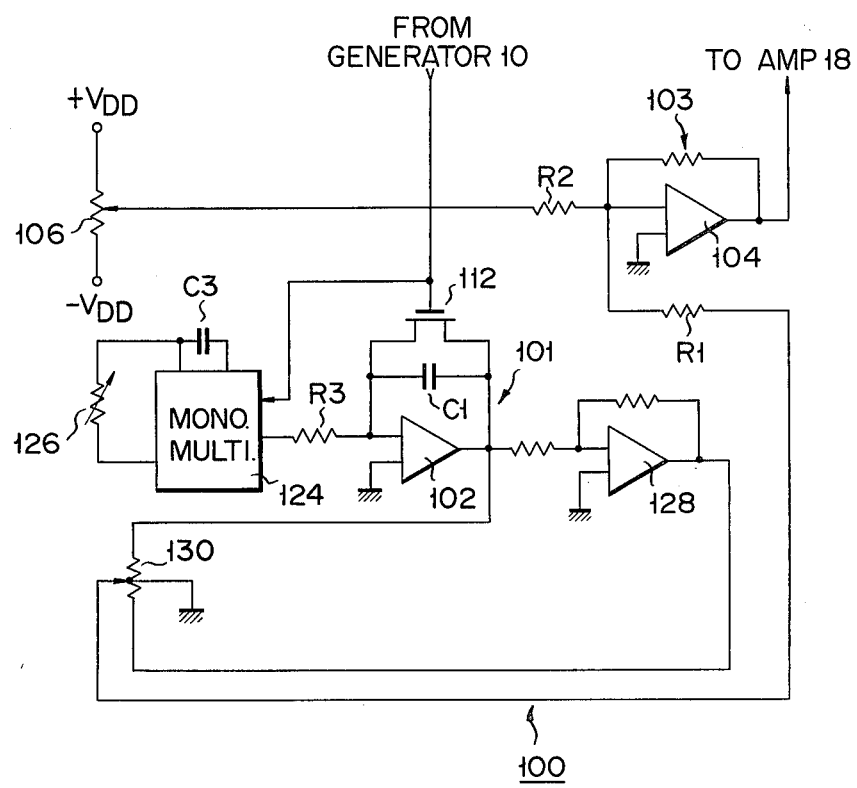
FIG. 8 shows a circuit diagram of a modification of a control circuit for feeding a control signal to the variable gain amplifier shown in FIG. 3.

FIG. 8 shows a modification of the gain control circuit 100 as shown in FIG. 3. In the figure the output terminal of a monostable multivibrator 124 triggered by the clock pulse from the clock pulse generator 10 is connected to the input terminal of the integrating circuit 101. An analogue switch 112 connected across the capacitor C1 of the integrating circuit 101 is turned on by the clock pulse from the clock pulse generator 10. The output terminal of the integrating circuit 101 is connected through a resistor to an inverter 128. A variable resistor 130 having a center tap grounded and a movable terminal connected to the input resistor R1 of the adder circuit 103 is inserted between the output terminals of the integrating circuit 101 and the inverter 128.

When the clock pulse generator 10 generates a clock pulse, the analogue switch 112 is turned on to discharge the capacitor C1 of the integrating circuit 101 and at the same time the monostable multivibrator 124 is set. Then, a 0 level signal is applied to the integrating circuit 101 during the period of time determined by the time constant defined by the capacitor C3 and the variable resistor 126. After the lapse of this time determined by this time constant, the output signal of the monostable multivibrator 124 becomes high in level and the integrating circuit 101 start to integrate the output signal of the monostable multivibrator 124 to produce a gradually decreasing signal. The output signal of the integrating circuit 101 is applied to the inverter 128 which in turn produces a gradually increasing signal. Accordingly, when the movable terminal of the variable resistor 130 is positioned between the center tap and that end of the variable resistor 130 to which the output terminal of the integrating circuit 102 is connected, the gradually decreasing signal is applied to the amplifier 104 via the resistor R1. On the other hand, when the movable terminal is set between the center tap and the other end of the variable resistor 130, the gradually increasing signal is applied to the adder 103. When the clock pulse is produced from the clock pulse generator 10, the capacitor C1 of the integrating circuit 101 is discharged so that the output voltage of the integrating circuit 101 becomes 0 in level.

While there has been described a preferred form of the invention, obviously modifications and variations are possible in light of the above teachings. For example, the embodiment shown in FIG. 3 employs the sector scanning system in which the ultrasonic pulses produced from the electro-acoustic transducing elements T-1 to T-N have specified time-delays, respectively, and the ultrasonic beams are radiated therefrom in different directions. Instead of the sector scanning system, a linear scanning system may be used in which a group of electro-acoustic transducing elements are successively driven for scanning. Another sector scanning system may be used in which one or more electro-acoustic transducing elements are repeatedly swung by mechanical means.

Figure 5:
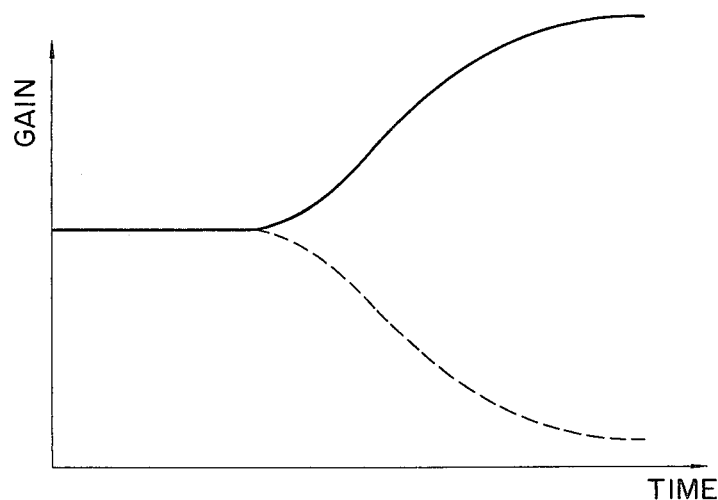
FIG. 5 shows a gain characteristic of a variable gain amplifier used in the ultrasonic diagnostic apparatus shown in FIG. 3.

As shown in FIG. 5 illustrating a gain characteristic, the gain of the variable gain amplifier 18 is kept at a constant value during a given period of time after the monostable multivibrator 114 responds to the clock pulse from the clock pulse generator 10 to be set. However, the gain of the variable gain amplifier 18 immediately after the pulser 12 produces a pulse may be decreased by using an additional pulse generator which responds to a clock pulse from the clock pulse generator 10 to produce a negative pulse to the adder circuit 103. The additional pulse generator can be effectively used to suppress a pulse which is supplied from the pulser 12 directly to the amplifier 14 and has a level relatively higher than a pulse supplied from the delay circuits D-1 to D-N to the amplifier 14.

Further, in the embodiment in FIG. 3, the integrating circuit 101 is used in order to generate a gradually changing signal according to an input signal, but it is also possible to use, instead of the integrating circuit 101, a different type function generator producing an output signal whose amplitude gradually increases or decreases at a rate according to the level and polarity of an input signal applied thereto.

What is claimed is:

1. An ultrasonic diagnostic apparatus comprising:
electrical pulse generating means;
electro-acoustic transducing means which responds to an electrical pulse generated by said pulse generating means to produce an ultrasonic pulse and which produces an electrical signal corresponding to an ultrasonic signal received;
a variable gain amplifier circuit which amplifies the electrical signal from said electro-acoustic transducing means and whose gain is changed in accordance with a gain control signal fed to the control terminal thereof; and
a gain control circuit including an integrating circuit for supplying an output signal to the control terminal of said variable gain amplifier circuit, first control means coupled with said integrating circuit to control the output signal from said integrating circuit, and second control means which responds to a pulse from said pulse generating means to cause said integrating circuit to start the integrating operation only after the passage of a selected time period following the receipt of the pulse from said pulse generating means.

2. An ultrasonic diagnostic apparatus according to claim 1, wherein said first control means is comprised of a variable signal generating circuit for supplying a selectively variable, level D.C. voltage signal to the input terminal of said integrating circuit.

3. An ultrasonic diagnostic apparatus according to claim 2, wherein said signal generating circuit is comprised of a first potentiometer which is connected between positive and negative power source terminals and connected at a movable terminal to the input terminal of said integrating circuit.

4. An ultrasonic diagnostic apparatus comprising:
electrical pulse generating means;
electro-acoustic transducing means which responds to an electrical pulse generated by said pulse generating means to produce an ultrasonic pulse and which produces an electrical signal corresponding to an ultrasonic signal received;
a variable gain amplifier circuit which amplifies the electrical signal from said electro-acoustic transducing means and whose gain is changed in accordance with a gain control signal fed to the control terminal thereof; and
a gain control circuit including an integrating circuit for supplying an output signal to the control terminal of said variable gain amplifier circuit, first control means coupled with said integrating circuit to control the signal to be integrated by said integrating circuit, second control means including a switch connected across said integrating circuit to selectively start and stop the integrating operation and circuit means which responds to a pulse from said pulse generating means to supply an output signal to said switch only after the passage of a selected period of time following the receipt of the pulse to cause said switch to turn on the integrating circuit.

5. An ultrasonic diagnostic apparatus according to claim 4 wherein said circuit means of the second control circuit means is a monostable multivibrator.

6. An ultrasonic diagnostic apparatus according to claim 5, wherein said monostable multivibrator includes a capacitor and a resistor at least one of which is variable to control the pulse width of a pulse generated from said monostable multivibrator in response to a pulse from said pulse generating means.

7. An ultrasonic diagnostic apparatus according to claim 4, wherein said switch is a field effect transistor.

8. An ultrasonic diagnostic apparatus comprising:
electrical pulse generating means;
electro-acoustic transducing means which responds to an electrical pulse generated by said pulse generating means to produce an ultrasonic pulse and which produces an electrical signal corresponding to an ultrasonic signal received;
a variable gain amplifier circuit which amplifies the electrical signal from said electro-acoustic transducing means and whose gain is changed in accordance with a gain control signal fed to the control terminal thereof; and
a gain control circuit including an integrating circuit for supplying an output signal to the control terminal of said variable gain amplifier circuit, first control means including an inverting circuit coupled with said integrating circuit for inverting the output signal from said integrating circuit and a first potentiometer connected between the output terminals of said integrating circuit and said inverting circuit and coupled at a movable terminal to the control terminal of said variable gain amplifier circuit, and second control means which responds to a pulse from said pulse generating means to cause said integrating circuit to start the integrating operation only after the passage of a selected period of time following the receipt of the pulse from said pulse generating means.

9. An ultrasonic diagnostic apparatus according to claim 8, wherein said first potentiometer has a center tap grounded.

10. An ultrasonic diagnostic apparatus according to claim 8 or 9, further comprising a second potentiometer producing an output signal from its movable terminal and an adder circuit which sums the output signals of said first and second potentiometers and applies the summed signal to the control terminal of said variable gain amplifier circuit.

11. An ultrasonic diagnostic apparatus according to claim 8 wherein said second control means includes a switch which is coupled across said integrating circuit and responds to a pulse from said pulse generating means to turn on said integrating circuit, and a monostable multivibrator which is coupled at its output terminal with the input terminal of said integrating circuit and responds to the pulse from said pulse generating means to initially produce a low level output signal and, after a selected time, produce a high level output signal.

12. An ultrasonic diagnostic apparatus comprising:
electrical pulse generating means;
electro-acoustic transducing means which responds to an electrical pulse generated by said pulse generating means to produce an ultrasonic pulse and which produces an electrical signal corresponding to an ultrasonic signal received,
a variable gain amplifier circuit which amplifies the electrical signal from said electro-acoustic transducing means and whose gain is changed in accordance with a gain control signal fed to the control terminal thereof; and
a gain control circuit including an integrating circuit for supplying an output signal to the control terminal of said variable gain amplifier circuit, first control means coupled with said integrating circuit to control the output signal from said integrating circuit, second control means which includes a switch connected across said integrating circuit and responds to a pulse from said pulse generating means to turn said integrating circuit on, and circuit means which has an output terminal connected to the input terminal of the integrating circuit and which responds to a pulse from said pulse generating means to supply an output signal to said integrating circuit only after the passage of a selected period of time following the receipt of the pulse from said pulse generating means.

13. An ultrasonic diagnostic apparatus according to claim 12 wherein said circuit means of said second control means is a monostable multivibrator.

14. An ultrasonic diagnostic apparatus according to claim 13, wherein said switch is a field effect transistor.

15. An ultrasonic diagnostic apparatus according to claim 13, wherein said monostable multivibrator includes a capacitor and resistor, at least one of which is variable to control the duration of the selected period of time before the monostable multivibrator supplies an output signal to the integrating circuit.

16. An ultrasonic diagnostic apparatus according to claim 13 wherein said electro-acoustic transducing means is a sector scanning type electro-acoustic transducer.

17. An ultrasonic diagnostic apparatus comprising:
electrical pulse generating means;
electro-acoustic transducing means which responds to an electrical pulse generated by said pulse generating means to produce an ultrasonic pulse and which produces an electrical signal corresponding to an ultrasonic signal received;
a variable gain amplifier circuit which amplifies the electrical signal from said electro-acoustic transducing means and whose gain is changed in accordance with a gain control signal fed to a control terminal thereof; and
a gain control circuit including first control means for supplying a time-variable output signal to the control terminal of said variable gain amplifier, a second control means including a switch connected across said first control means to selectively turn on and off said first control means and circuit means which responds to a pulse from said pulse generating means to supply an output signal to said switch only after the passage of a selected period of time following the receipt of the pulse to cause said switch to turn on said first control means.

18. An ultrasonic diagnostic according to claim 17 wherein said circuit means of said second control means is a monostable multivibrator.

19. An ultrasonic diagnostic apparatus according to claim 18, wherein said switch is a field effect transistor.

20. An ultrasonic diagnostic apparatus according to claim 18, wherein said monostable multivibrator includes a capacitor and a resistor at least one of which is variable to control the pulse width of a pulse generated from said monostable multivibrator in response to a pulse from said pulse generating means.

21. An ultrasonic diagnostic apparatus comprising:
pulse generating means;
electro-acoustic transducing means which responds to a pulse generated by said pulse generating means to produce an ultrasonic pulse and which produces an electrical signal corresponding to an ultrasonic signal received;
a variable gain amplifier circuit which amplifies the electrical signal from said electro-acoustic transducing means and whose gain is changed in accordance with a gain control signal fed to the control terminal thereof; and
a gain control circuit including first control means including a function generator, having an input terminal, for supplying a time-variable output signal to the control terminal of said variable gain amplifier circuit, an inverting circuit for inverting the output signal from said function generator, a first potentiometer connected between the output terminals of said integrating circuit and said inverting circuit and coupled at a movable terminal to the control terminal of said variable gain amplifier circuit, and second control means which responds to a pulse from said pulse generating means to cause said integrating circuit to start the integrating operation only after the passage of a selected period of time following the receipt of the pulse from said pulse generating means.

22. An ultrasonic diagnostic apparatus according to claim 21, wherein said first potentiometer has a center tap grounded.

23. An ultrasonic diagnostic apparatus according to claim 22, further comprising a second potentionmeter producing an output signal from its movable terminal and an adder circuit which sums the output signals of said first and second potentiometers and applies the summed signal to the control terminal of said variable gain amplifier circuit.

24. An ultrasonic diagnostic apparatus according to claim 22 or 23 wherein said second control means includes a switch which is coupled across said function generator and responds to a pulse from said pulse generating means to turn said function generator on, and a monostable multivibrator which is coupled at its output terminal with the input terminal of said function generator and responds to the pulse from said pulse generating means to initially produce a low level output signal and, after a selected time, produce a high level output signal.

25. An ultrasonic diagnostic apparatus according to claim 24, wherein said switch is a field effect transistor.

26. An ultrasonic diagnostic apparatus according to claim 24, wherein said monostable multivibrator includes a capacitor and a resistor at least one of which is variable to control the duration of the low level of a signal generaged from the monostable multivibrator in response to the pulse from said pulse generating means.

27. An ultrasonic diagnostic apparatus according to claim 21 further comprising a second potentiometer producing an output signal from its movable terminal and an adder circuit which sums the output signals of said first and second potentiometers and applies the summed signal to the control terminal of said variable gain amplifier circuit.

28. An ultrasonic diagnostic apparatus according to claim 21 or 27 wherein said second control means includes a switch which is coupled across said function generator and responds to a pulse from said pulse generating means to turn said function generator on, and a monostable multivibrator which is coupled at its output terminal with the input terminal of said function generator and responds to the pulse from said pulse generating means to initially produce a low level output signal and, after a selected time, produce a high level output signal.

29. An ultrasonic diagnostic apparatus according to any one of preceding claims 21, wherein said electro-acoustic transducing means is a sector scanning type electro-acoustic transducer.

30. An ultrasonic diagnostic apparatus comprising:
electrical pulse generating means;
electro-acoustic transducing means which responds to an electrical pulse generated by said pulse-generating means to produce an ultrasonic pulse and which produces an electrical signal corresponding to an ultrasonic signal received; a variable gain amplifier circuit which amplifies the electrical signal from said electro-acoustic transducing means and whose gain is changed in accordance with a gain control signal fed to the control terminal thereof;
an adder circuit; and
gain control circuit including an integrating circuit for supplying an output signal to said adder circuit, first control means coupled with said integrating circuit to control the output signal from said integrating circuit, second control means responsive to a pulse from said pulse-generating means to cause said integrating circuit to start the integrating operation only after the passage of a selected period of time following the receipt of the pulse from said pulse generating means, a potentiometer for supplying a selectively variable level D.C. voltage to the adder circuit, said adder circuit summing the output signals of said potentiometer and said integrating cirucit and applying the summed signal to the control terminal of said variable gain amplifier circuit.

31. An ultrasonic diagnostic apparatus according to claim 30 wherein said first control means is comprised of a variable signal generating circuit for supplying a selectively variable level D.C. voltage to the input terminal of said integrating circuit.

32. An ultrasonic diagnostic apparatus according to claim 31, wherein said signal generating circuit is comprised of a first potentiometer which is connected between positive and negative power source terminals and connected at a movable terminal to the input terminal of said integrating circuit.

33. An ultrasonic diagnostic apparatus comprising:
electrical pulse generating means;
electro-acoustic transducing means which responds to an electrical pulse generated by said pulse generating means to produce an ultrasonic pulse and which produces an electrical signal corresponding to an ultrasonic signal received;
a variable gain amplifier circuit which amplifies the electrical signal from said electro-acoustic transducing means and whose gain is changed in accordance with a gain control signal fed to a control terminal thereof;
an adder circuit; and
a gain control circuit including first control means for supplying a time-variable output signal to said adder circuit, second control means responding to a pulse from said pulse generating means for supplying an output signal to said first control means to cause said first control means to supply said time-variable output signal only after a passage of a selected period of time following the receipt of the pulse from the pulse generating means, a potentiometer for supplying a selectively variable level D.C. voltage signal to said adder circuit; said adder circuit summing the output signals of said first control means and said potentiometer and supplying the summed signals to the control terminal of said variable gain amplifier circuit to change the gain of said variable gain amplifier.

34. An ultrasonic diagnostic apparatus according to claim 33 wherein said first control means is comprised of;
a function generator having an input terminal; and
a variable signal generator circuit for supplying a selectively variable level D.C. voltage to the input terminal of said function generator.

35. An ultrasonic diagnostic apparatus according to claim 34, wherein said variable signal generator circuit is comprised of a potentiometer connected between positive and negative power source terminals and connected at a movable terminal to the input terminal of said function generator.

* * * * *